United States Patent
Ohara

(10) Patent No.: US 7,325,031 B2
(45) Date of Patent: Jan. 29, 2008

(54) SERVICE PROVIDING SYSTEM FOR PROVIDING SERVICES USING A DEVOTED WEB PAGE CREATED BY A WEB SERVER PROVIDED OUTSIDE AND CONNECTED TO A NETWORK

(75) Inventor: Kiyotaka Ohara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 825 days.

(21) Appl. No.: 10/395,113

(22) Filed: Mar. 25, 2003

(65) Prior Publication Data

US 2003/0187922 A1 Oct. 2, 2003

(30) Foreign Application Priority Data

Mar. 29, 2002 (JP) ............................. 2002-095347

(51) Int. Cl.
G06F 15/16 (2006.01)
G06F 15/173 (2006.01)
(52) U.S. Cl. ..................... 709/203; 709/217; 709/218; 709/219; 709/242
(58) Field of Classification Search ................ 709/203, 709/217, 218, 219, 223, 227, 209, 225, 242
See application file for complete search history.

(56) References Cited

U.S. PATENT DOCUMENTS

| | | | |
|---|---|---|---|
| 6,182,078 B1 * | 1/2001 | Whitmyer, Jr. | 709/218 |
| 6,202,023 B1 | 3/2001 | Hancock et al. | |
| 6,473,788 B1 * | 10/2002 | Kim et al. | 709/209 |
| 6,629,134 B2 * | 9/2003 | Hayward et al. | 709/217 |
| 6,789,078 B2 * | 9/2004 | Saitou et al. | 709/227 |
| 7,126,716 B1 * | 10/2006 | Kaufman et al. | 358/1.18 |
| 2001/0037192 A1 | 11/2001 | Shimamoto et al. | |
| 2001/0039616 A1 | 11/2001 | Kumagai et al. | |
| 2001/0042117 A1 * | 11/2001 | Yoshino et al. | 709/223 |
| 2001/0052003 A1 * | 12/2001 | Seki et al. | 709/219 |
| 2002/0032491 A1 * | 3/2002 | Imamura et al. | 700/79 |
| 2002/0059395 A1 * | 5/2002 | Liou | 709/217 |
| 2002/0103860 A1 * | 8/2002 | Terada et al. | 709/203 |
| 2002/0143898 A1 * | 10/2002 | Mansfield et al. | 709/219 |
| 2003/0093498 A1 * | 5/2003 | Simpson et al. | 709/218 |
| 2003/0140141 A1 * | 7/2003 | Mullen et al. | 709/225 |

FOREIGN PATENT DOCUMENTS

| JP | A 11-120127 | 4/1999 |
|---|---|---|
| JP | A 2000-10786 | 1/2000 |

(Continued)

Primary Examiner—Quang N. Nguyen
(74) Attorney, Agent, or Firm—Oliff & Berridge, PLC

(57) ABSTRACT

A service providing system providing an improved comfortability when a user receives services offered using a web page. In the service providing system, a printer transmits information (e.g. the MAC address and information of status and consumables) related to the printer to a web server on the Internet. The web server creates a web page devoted to the printer, for providing services related to the printer (e.g. download of software already set up for the printer and indication of information of the consumables for the printer), based on the information received from the printer. With the service providing system, a user of the printer can receive services related to the printer by accessing to the web page through the web browser of a printer.

42 Claims, 13 Drawing Sheets

FOREIGN PATENT DOCUMENTS

| | | |
|---|---|---|
| JP | A 2000-200187 | 7/2000 |
| JP | A-2001-022438 | 1/2001 |
| JP | A-2001-142984 | 5/2001 |
| JP | A 2001-282609 | 10/2001 |
| JP | A 2001-282732 | 10/2001 |
| JP | A-2001-336751 | 12/2001 |
| JP | A-2002-082912 | 3/2002 |
| JP | A 2002-297619 | 10/2002 |
| WO | WO 01/90653 A1 | 11/2001 |

* cited by examiner

FIG.3

User Registration Page

- User ID
- Name or Company
- Address
- City
- Country
- ZIP
- Phone
- E-mail

☐ Regist This Printer

[ Submit ]  [ Cancel ]

[Help]

FIG. 5

```
         NVRAM CONFIGURATION
    ┌─────────────────────────────────┐
    │                                 │
    │        USER INFORMATION         │
    │ ------------------------------- │
    │                                 │
    │               ⋮                 │
    │                                 │
    │ ------------------------------- │
    │    WEB PAGE REGISTRATION        │
    │            FLAG                 │
    └─────────────────────────────────┘
                        │
                       20
```

YOUR NAME: I&G COMPANY
SERVICE CENTER IN YOUR AREA
PRADAR XX CENTER
NEARBY PRADAR PRODUCT SUPPLIER

EVENT INFORMATION
MARCH 26 13:00 PRADAR FESTIVAL 2003 WILL BE HELD IN ◯◯PARK.
THE FESTIVAL WILL BE FULL OF EVENTS SUCH AS AN EXHIBITION AND
SALE OF NEW PRODUCTS.

LINK TO PRINTER INFORMATION PAGE FOR YOUR MODEL

| BRN_345555 | HL-5XXX |
| BRN_326666 | HL-6XXX |

FIG. 9

| USER ID | MAC ADDRESS | URL OF USER INFORMATION PAGE | URL OF PRINTER INFORMATION PAGE |
|---|---|---|---|
| sea51 | 45:33:22:F9:01:2C | http://www.support.com/sea51 | http://www.support.com/sea51/BRN_345555 |
| sea51 | 45:33:22:F8:03:3C | http://www.support.com/sea51 | http://www.support.com/sea51/BRN_346666 |
| mar22 | 45:33:22:E9:41:25 | http://www.support.com/mar22 | http://www.support.com/mar22/BRN_345555 |
| par7 | 45:33:22:79:01:6C | http://www.support.com/par7 | http://www.support.com/par7/BRN_345555 |

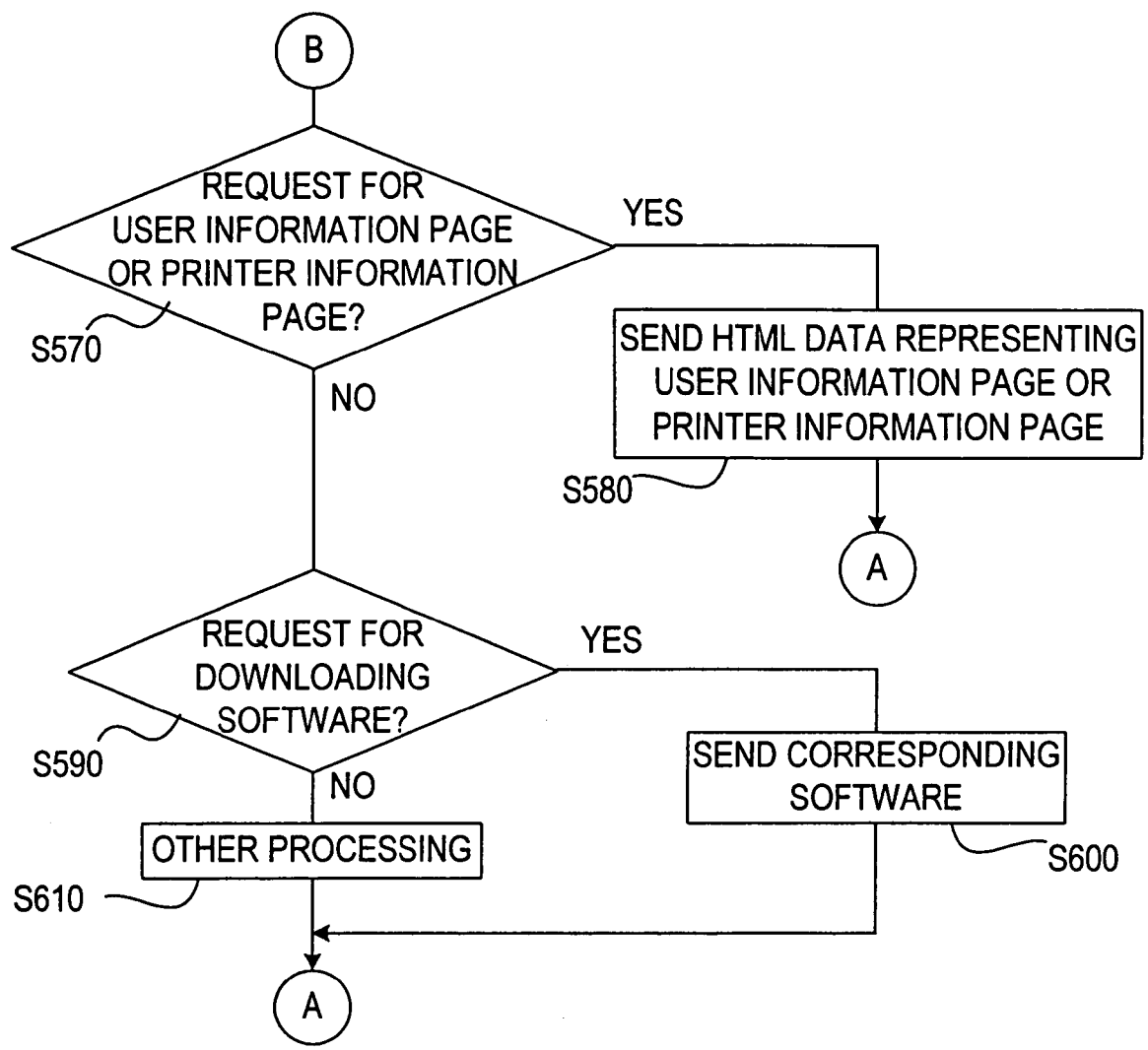

SERVICE PROVIDING SYSTEM FOR PROVIDING SERVICES USING A DEVOTED WEB PAGE CREATED BY A WEB SERVER PROVIDED OUTSIDE AND CONNECTED TO A NETWORK

BACKGROUND OF THE INVENTION (1) Field of the Invention

The present invention relates to technology for providing services related to an apparatus using a web page.

(2) Background Art

Conventionally, it is known that services in respect with an apparatus such as a printer are provided on a web site on the Internet managed by the manufacturer and supplier of the apparatus using the web page. Examples of such services are downloading a new version of software related to the apparatus and showing information regarding consumables and optional accessories of the apparatus. Services of this type of are convenient because any user of the apparatus can easily receive the services at any time by simply accessing to the web site.

The web site described above is used by a large number of users, and the service each user requests is different depending on the condition of use and the model of the apparatus the user owns. For this reason, a large volume of information is prepared on the web site in order to handle a variety of requests, which means that the amount of the information displayed on the web page and the number of web pages itself may be quite large. On the other hand, from the viewpoint of the user of the apparatus, the user must search for the information he or she needs from among a large volume of information, which reduces comfortability when he or she receives the service. However, if the amount of information offered on the web site is reduced in order to avoid such inconvenience, elaborate services cannot be provided.

An object of the present invention, which has been made to solve the above problems, is to improve the comfortability when a user receives services provided by using a web page.

SUMMARY OF THE INVENTION

The above and other objects are attained by a service providing system for providing services related to an apparatus by means of a web server using a web page wherein the apparatus comprises a transmitting unit that transmits specific information specific to the apparatus to the web server provided outside and connected to a network, and wherein the web server comprises a receiving unit that receives the specific information of the apparatus transmitted by the transmitting unit, and a web page creating unit that creates a devoted web page related to the apparatus from which the specific information is transmitted based on the specific information received by the receiving unit. In brief, the apparatus transmits the specific information to the web server provided separately from the apparatus.

According to the service providing system of the invention, the comfortability when a user of the apparatus receives services is improved by the fact that the web server provides the services using the web page devoted to the apparatus. Namely, information unrelated to the apparatus is not required to be prepared on the web page devoted to the apparatus, which reduces the amount of information. As a result, it is easier for the user to locate the necessary information.

Also, since the web server separate from the apparatus provides the services using the web page devoted to the apparatus, a variety of information, which cannot be obtained by the apparatus alone, may be provided. In addition, even detailed information is provided by the web server which can store a large volume of information difficult to be stored in the apparatus.

To transmit the specific information from the apparatus to the outside web server, it is preferable to perform information transmission by HTTP using a most versatile Ethernet (registered trademark) Interface or a wireless LAN interface.

In another aspect of the invention, the devoted web page displays information corresponding to the specific information, and the user can view the information related to the apparatus owned by the user on the web page.

In a further aspect of the invention, the devoted web page is designed for downloading software corresponding to the specific information, and the user can easily obtain the software corresponding to the apparatus owned by the user. Software corresponding to the specific information here may be software usable for an apparatus assumed from the specific information, or may be software set up based on the specific information by the web server. The latter case, where it is possible to download software, setting up of which is normally done by the user but is already completed, is especially advantageous when the software requires special knowledge to set up the same.

In another aspect of the invention, the devoted web page is linked to the web page which provides the services corresponding to the specific information, and the user is able to arrive at the web page related to the apparatus easily.

In a further aspect of the invention, there is provided a service providing system wherein a URL outputting unit provided for the web server outputs the URL of the web page created by the web page creating unit. This enables the user to obtain the URL of the web page.

In yet another aspect of the invention, there is provided a service providing system, wherein the apparatus comprises an apparatus-related web page providing unit that provides an apparatus-related web page related to the apparatus in response to the request from an outside apparatus provided with a web browser and a URL obtaining unit that obtains the URL output by the URL outputting unit provided for the web server. The apparatus also displays link specified by the URL obtained by the URL obtaining unit on the apparatus-related web page provided by the apparatus-related web page providing unit. This enables obtainment of the URL of the devoted web page created by the web server by viewing the apparatus-related web page from the outside apparatus provided with the web browser.

The specific information transmitted from the apparatus to the web server may not only be static information about the apparatus but also be information changeable depending on the state of use of the apparatus, and the like. When the specific information is changeable information, it is impossible for the web server to keep up on the change of the specific information if the apparatus transmits the specific information to the web server only once.

In a further aspect of the invention, there is provided a service providing system, wherein the transmitting unit provided for the apparatus transmits the specific information to the web server at each predetermined timing, and when the devoted web page related to the apparatus, from which the specific information received by the receiving unit is transmitted, is already created, the web page creating unit updates the contents of the web page based on the received specific information. This enables the web server to keep up on the change of the state of the apparatus and to provide elaborate services in accordance with the change thereof.

In a further aspect of the invention, there is provided a service providing system wherein the apparatus includes trouble detecting unit that detects a trouble related to the apparatus, and the transmitting unit provided for the apparatus uses the timing when a trouble is detected by the trouble detecting unit as the predetermined timing for transmitting the specific information to the web server. This enables the web server to promptly find out that the trouble is detected in the apparatus and to provide the service accordingly.

In yet another aspect of the invention, there is provided an apparatus for use in a service providing system wherein a web server for creating a web page based on information received from the apparatus provides services related to the apparatus using the web page. The apparatus comprises a transmitting unit that transmits specific information specific to the apparatus to the web server provided outside and connected to a network. In brief, the specific information is transmitted to the web server provided separate from the apparatus. In this case, the apparatus makes the web server create the web page based on the specific information of the apparatus (i.e. the web page devoted to the apparatus).

In a further aspect of the invention, there is provided a web server connected to a network for providing services related to an apparatus using a web page. The web server comprises a receiving unit that receives specific information specific to the apparatus and transmitted from the apparatus provided outside and a web page creating unit for creating a devoted web page related to the apparatus, from which the specific information is transmitted, based on the specific information received by the receiving unit. With this configuration, the web server is able to provide services related to the apparatus using the devoted web page related to the apparatus, from which the specific information is transmitted.

In another aspect of the invention, there is provided a service providing method for providing services related to an apparatus using a web page. In the service providing method, the apparatus transmits specific information specific to the apparatus to an outside web server connected to a network, and the web server creates a devoted web page related to the apparatus, from which the specific information is transmitted, based on the specific information transmitted from the apparatus.

BRIEF DESCRIPTION OF THE DRAWINGS

A preferred embodiment of the present invention will be described hereinafter with reference to the drawings, in which:

FIG. 3 is an explanatory view illustrating a user registration page;

FIG. 5 is an explanatory view illustrating the configuration of information stored in NVRAM;

FIG. 8 is an explanatory view illustrating a user information page;

FIG. 9 is an explanatory view illustrating the database in a storage;

FIGS. 12A and 12B are flowcharts showing the processing performed by the CPU of the web server.

DETAILED DESCRIPTION OF THE PREFERRED EMBODIMENT

Figure 1:
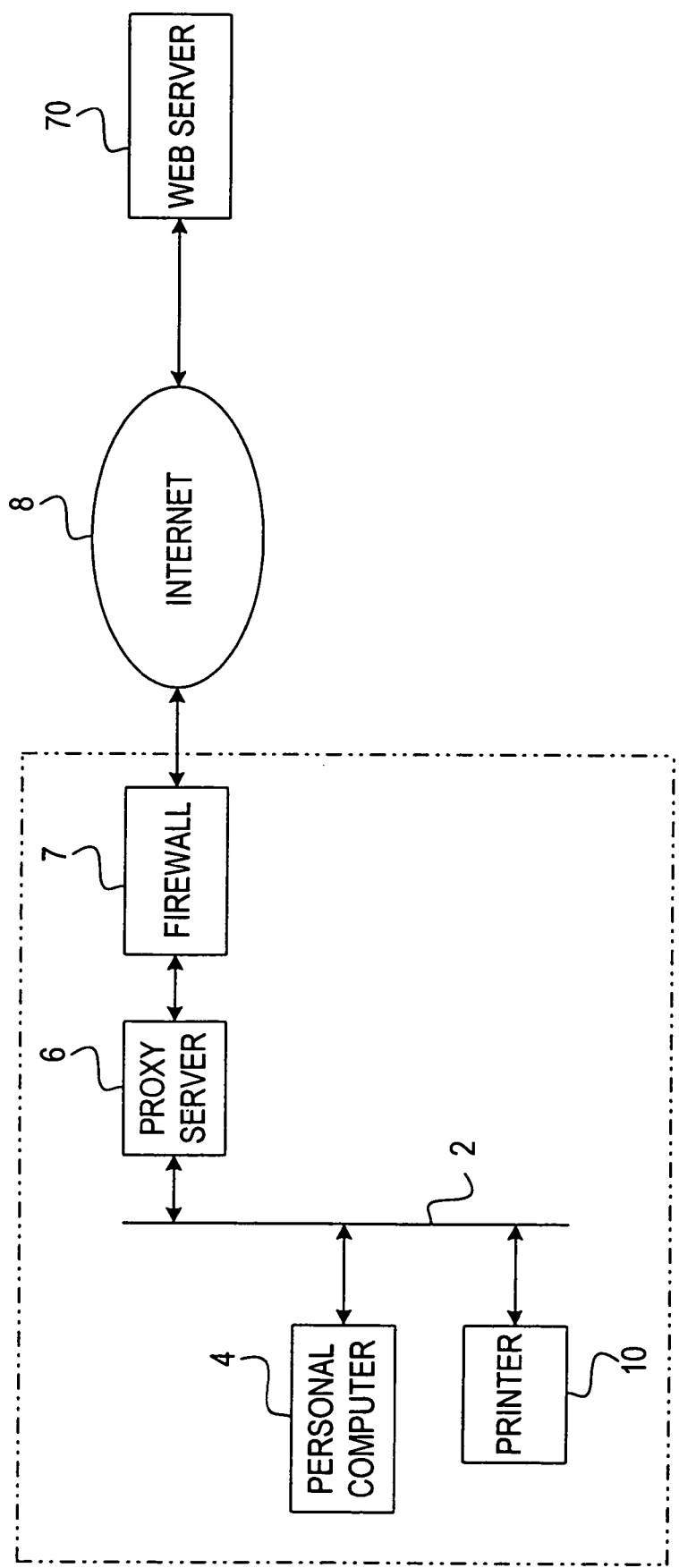
FIG. 1 is a block diagram showing the configuration of a service providing system according to the present embodiment.

As shown in FIG. 1, a service providing system according to a preferred embodiment of the present invention, which is to provide services related to a printer 10 manufactured and supplied by a printer manufacturer and supplier, using a web page through a web server 70 (hereinafter also referred to as "solution center") on the Internet 8 managed by the manufacture and supplier, comprises the printer 10 and the web server 70.

Figure 2:
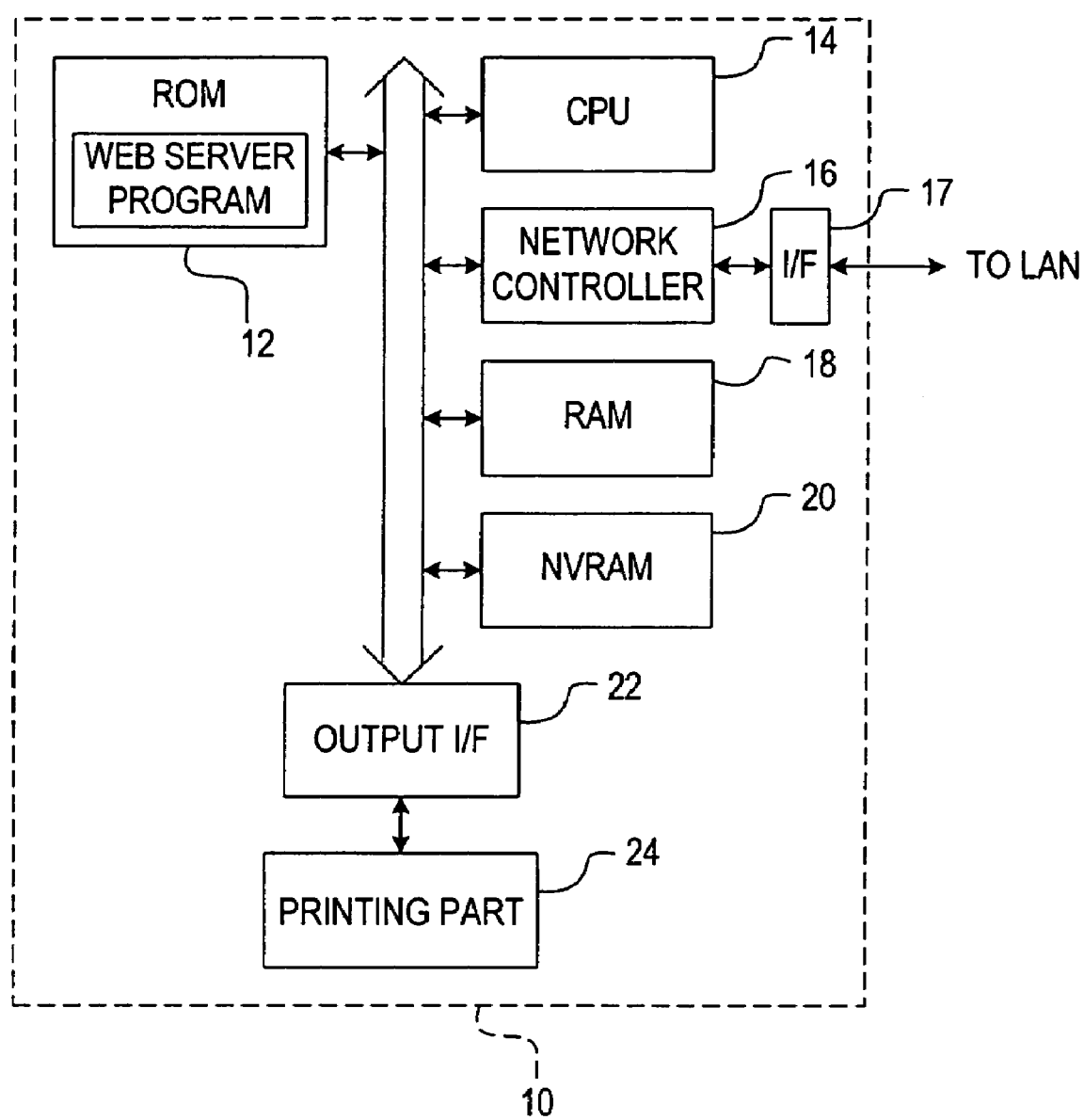
FIG. 2 is a block diagram showing the configuration of a printer.

In this service providing system, the printer 10 is connected to a LAN (Local Area Network) 2, to which a personal computer 4 is connected, via an Ethernet Interface 17, and communicates with the web server 70 on the Internet 8 via a proxy server 6 and a fire wall 7. In addition, the printer 10 has, as is shown in FIG. 2, a ROM 12, a CPU 14, a network controller 16, an Ethernet Interface 17, a RAM 18, an NVRAM 20, an output interface 22, and a printing part 24.

A web server program is stored in the ROM 12. The web server program, as is already known, makes the CPU 14 perform the function as a web server of providing the web page belonging to the printer 10 (i.e. corresponding to the apparatus-related web page) by using HTML (Hyper Text Markup Language data and CGI (Common Gateway Interface).

Here, among the web pages belonging to the printer 10, a user registration page and a link page, which are relevant to the present invention, will now be described, respectively.

The user registration page 30, as is shown in FIG. 3, has a plurality of input fields 32 through 46 for inputting a variety of information necessary for user registration including, user name, user address, and other items. For example, an input field 46 is for inputting a user's e-mail address. When a user of the printer 10 performs user registration on the user registration page 30, the user inputs required items or information in all the input fields from 34 through 46 except for a user ID input field 32, checks a check box 48 and clicks a "Submit" button 50 using the web browser of the personal computer 4. Then, the input information is transmitted to the printer 10 as user information by the web browser. Once user registration is performed, a user ID for identifying the user is assigned to the user, as is described hereinafter. Therefore, the same user is required to fill only the user ID input field 32 among the plurality of input fields from 32 through 46 when the user performs user registration again Here, a particular example of the same user performing user registration a plurality of times is the case where the user owns a plurality of printers 10 and wants to be registered as a user of each printer.

Figure 4:
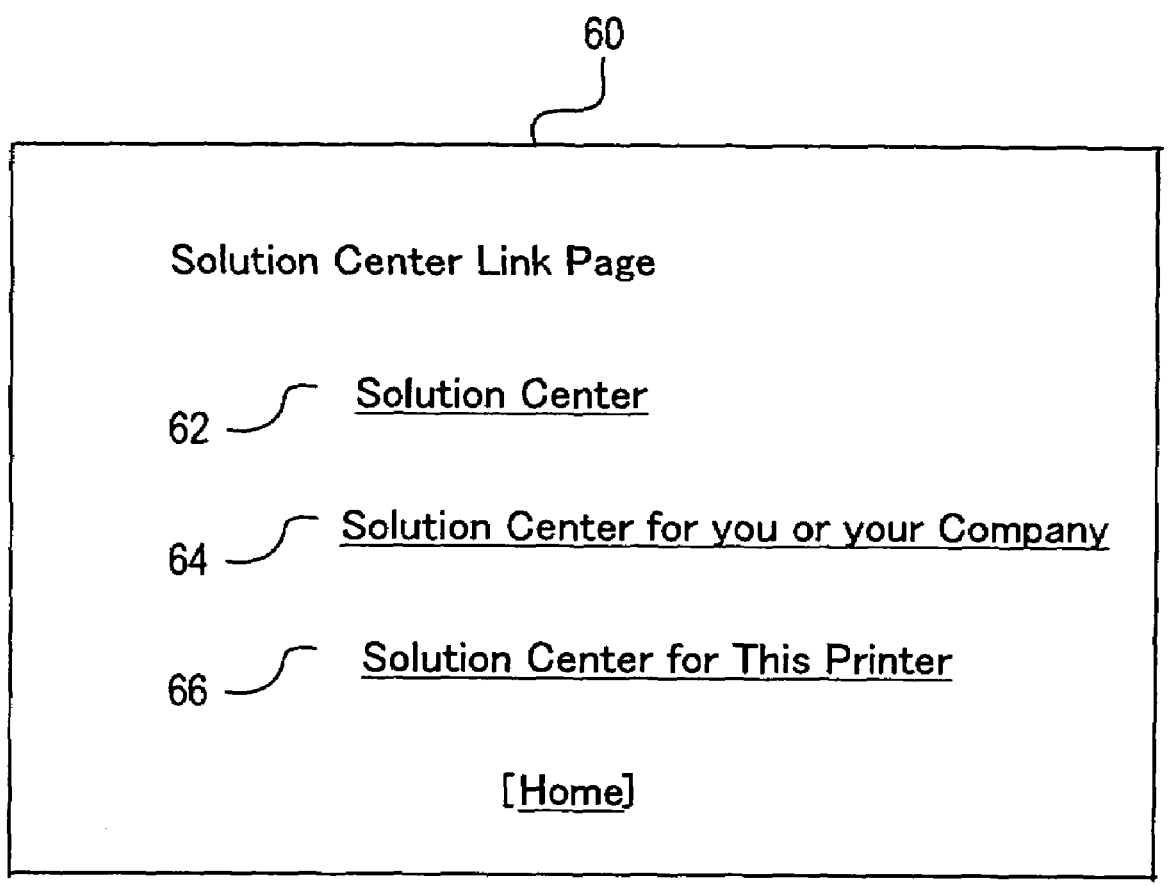
FIG. 4 is an explanatory view illustrating a link page.

As is shown in FIG. 4, a link page 60 is linked to the web page of the solution center. More specifically, a title 62 linked to the top page of the solution center, a title 64 linked to a user information page to be hereinafter described, and a title 66 linked to a printer information page to be hereinafter described are displayed. In the initial stage prior to user registration, in which either a user information page or a printer information page has not been set up, linking from the link page 60 is possible only to the top page. When the URL of the user information page or the printer information page is transmitted from the web server 70, as is described hereinafter, the URL is set up as an address to be linked from the above mentioned titles 64 or 66.

In the NVRAM 20, as is shown in FIG. 5, user information transmitted from the personal computer 4 (i.e. information input on the user registration page 30) as well as a web page registration indication flag to be used for the after-mentioned processing are stored. The initial value of the web page registration indication flag is set to "0".

The personal computer 4 is a general-purpose computer provided with a web browser for browsing web pages. The web browser, as is known, transmits to the web server 70 a request based on the operation implemented at the personal computer 4 in accordance with the HTTP (Hyper Text Transfer Protocol). For example, when the operation to access to a web page with a URL is implemented at the personal computer 4, the path name of the designated URL is transmitted together with a GET command in order to request the HTML data representing the web page. Thereafter, when the HTML data sent at the request is received, the web page represented by the data is displayed on a not-shown display of the personal computer 4.

Figure 6:
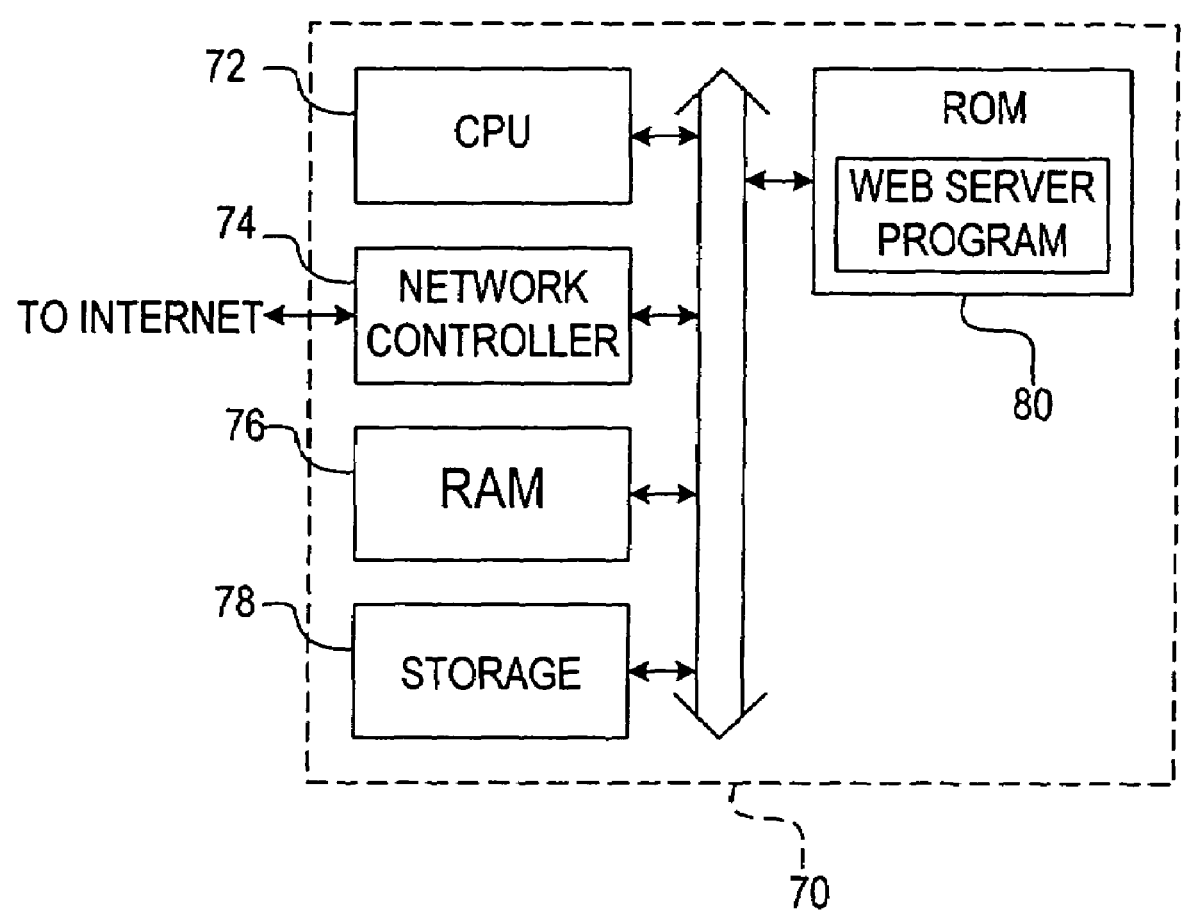
FIG. 6 is a block diagram showing the configuration of a web server.

As is shown in FIG. 6, the web server 70 has a CPU 72, a network controller 74, a RAM 76, a storage 78, and a ROM 80. In the ROM 80, a web server program is stored in the same manner as in the ROM 12 of the printer 10.

The web page provided by the web server 70 will now be described below.

The web server 70 provides printer information pages devoted to respective printers 10 and user information pages devoted to respective users in addition to a usual web page to be commonly browsed by a large number of users.

Figure 7:
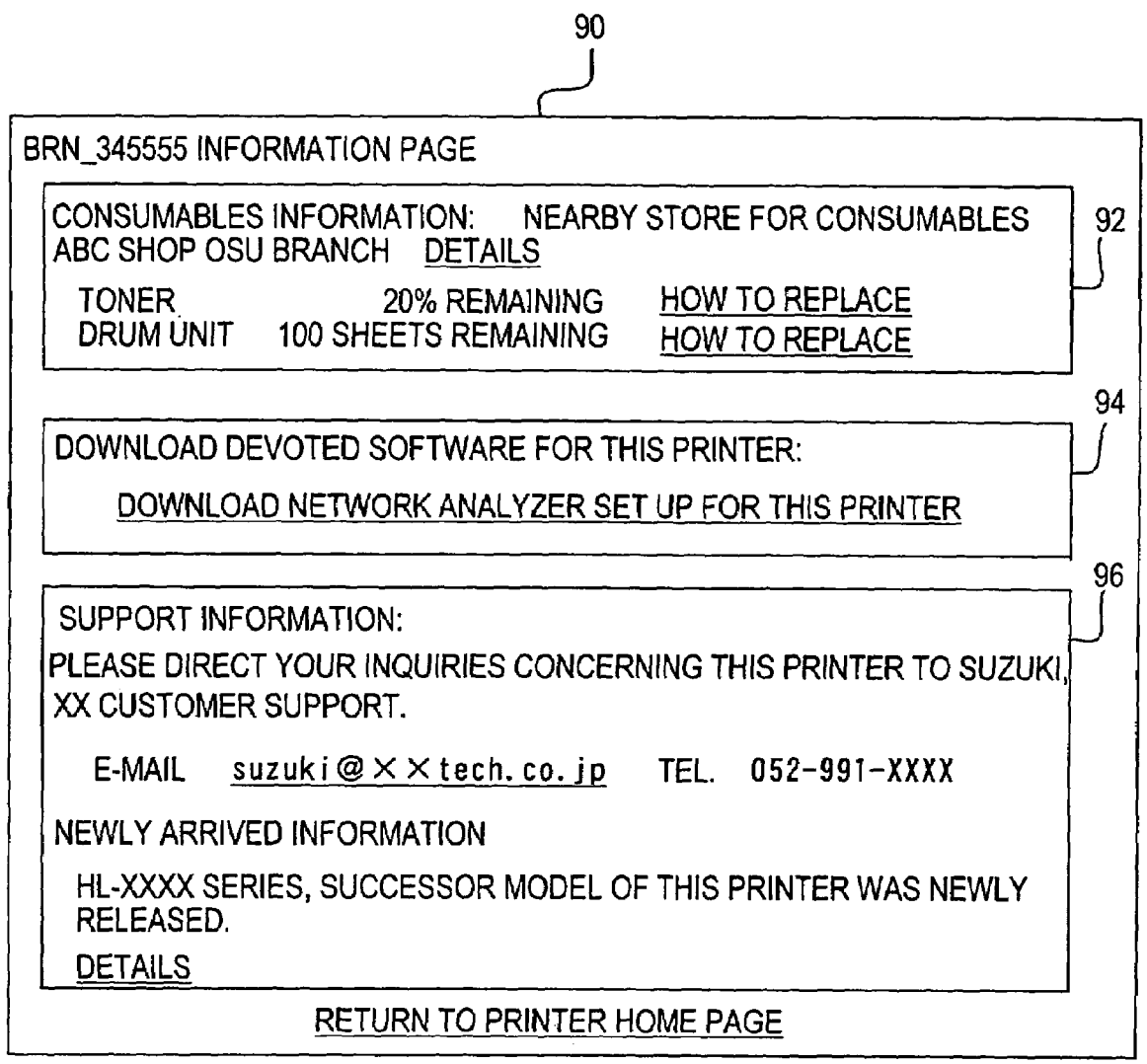
FIG. 7 is an explanatory view illustrating a printer information page.

In a printer information page 90, as is shown in FIG. 7, information in respect with the relevant printer 10 of the page is displayed. Specifically, the page is provided with a consumables information column 92, a software download column 94 and a support information column 96.

In the consumables information column 92, information of the remaining amount of consumables for the printer 10 (for example, the remaining amount of toner is 20%) is indicated. In addition, links to a web page for describing a method of exchanging the consumables and to a web page showing detailed information about nearby stores, where the consumables are available, are provided.

In the software download column 94, a title for downloading a network analyzer program (hereinafter simply referred to as "network analyzer") which is already set up for the printer 10 relevant to the printer information page 90, is indicated. By clicking the title, it is possible to download the network analyzer in which setting of the MAC (Media Access Control) address of the printer 10 and the like has been completed.

To use a usual network analyzer, it is necessary to set up an apparatus about which data should be collected, which requires special knowledge regarding the network. Therefore, it often happens that even if a user has successfully downloaded a network analyzer, the user is unable to use it.

Contrary to this, with the printer information page 90, it is possible to download a network analyzer, which has already been set up so as to filter by the MAC address of the printer 10, and thus a user is able to use the network analyzer without further setup.

Software which can be downloaded is not limited to this type of software set up exclusively for the printer 10, but software or firmware, for example, corresponding to the model name (type) of the printer 10 may be prepared.

In the support information column 96, the contact place and newly arrived information are indicated, and in addition, a link to the web page showing the details of the newly arrived information is attached.

In the user information page 100, as shown in FIG. 8, a link to the printer information page 90 in respect with the printer 10 owned by the user is attached, and in addition, simple information in respect with the printer 10 owned by the user is indicated. The information such as "Service Center in Your Area", "Nearby Pradar Product Supplier" and "Event Information" is automatically created according to the address of the user.

The storage 78, as is shown in FIG. 9, has a database for systematically storing the user ID's of the registered users and the MAC addresses of the printers 10 registered as well as the URL's of the corresponding user information pages 100 and the corresponding printer information pages 90.

Figure 10:
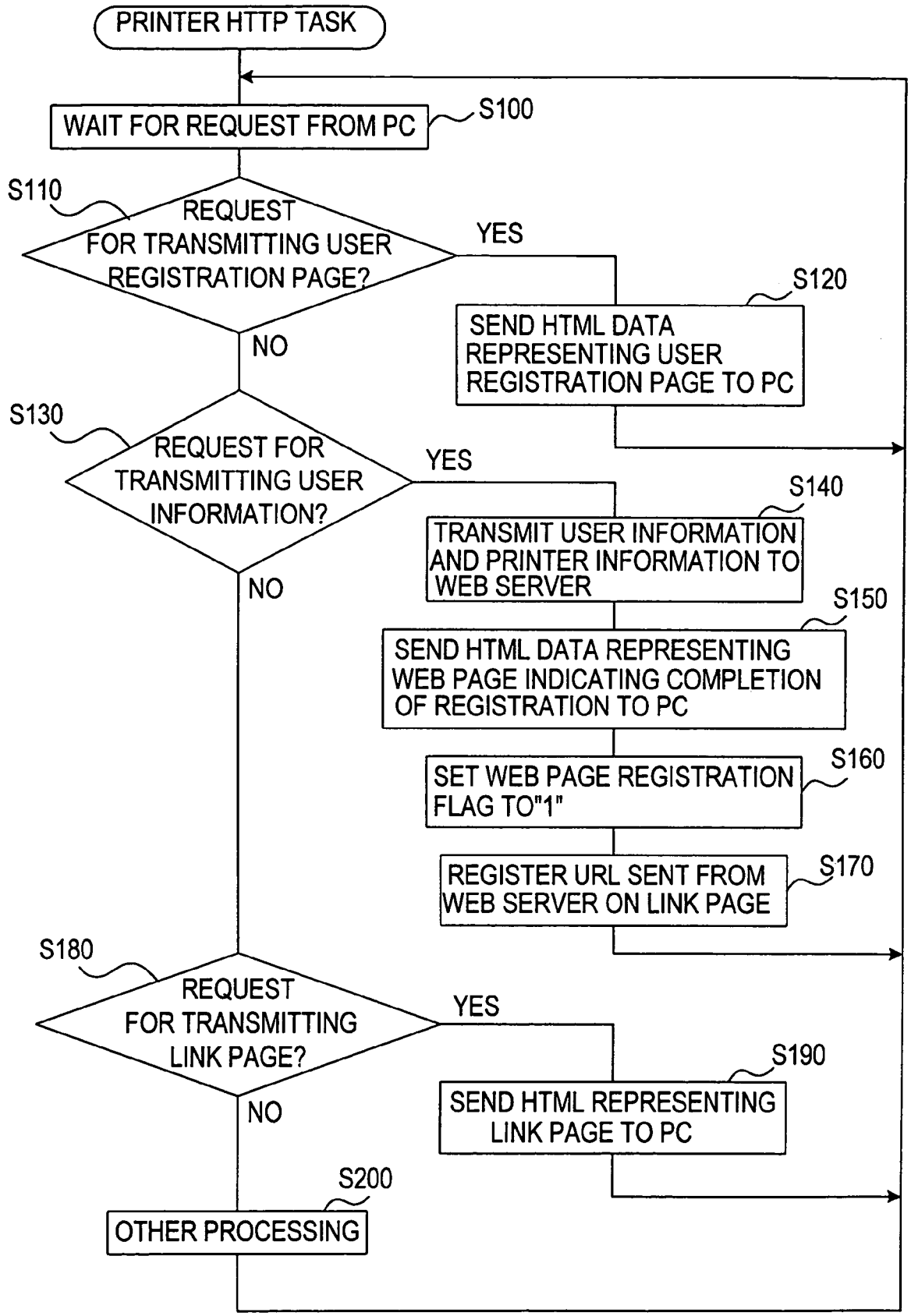
FIG. 10 is a flowchart showing the processing of a printer HTTP task.

Processing of a printer HTTP task, which is implemented by the CPU 14 of the printer 10, will now be described with reference to a flowchart of FIG. 10.

Once the printer HTTP task is started, processing enters and remains in the waiting state in S100 until a request from the personal computer 4 (more specifically, from the web browser of the personal computer 4) is received, and processing proceeds to S110 upon receiving the request.

In S110, it is determined whether or not the request from the personal computer 4 is a request for transmitting the user registration page 30.

When it is determined in S110 that the request from the personal computer 4 is a request for transmitting the user registration page 30, processing proceeds to S120, where the HTML data representing the user registration page 30 is sent to the personal computer 4 via the network controller 16, and then returns to S100.

When it is determined in S110, on the other hand, that it is not a request for transmitting the user registration page 30, processing proceeds to S130, where a determination is made whether or not the request from the personal computer 4 is a request for transmitting user information. The user information in this case means the user information transmitted from the personal computer 4 together with a POST command when the "Submit" button 50 on the user registration page 30 (FIG. 3) is clicked.

Then, when it is determined in S130 that it is a request for transmitting the user information, the below described processing from S140 through S170 is performed and processing returns to S100.

First, in S140, the user information received (namely, the information input on the user registration page 30) and the printer information, which is the information in respect with the relevant printer 10 (corresponding to specific information), are transmitted to the web server 70 via the network controller 16 along with the POST command. In the present embodiment, information of the MAC address, the printer name, the model name, the version and the status as well as the consumables is transmitted as the printer information. The CPU 14 allows the user information received from the personal computer 4 to be stored in the NVRAM 20. Information of status and consumables includes information regarding the amount used in respect with consumables such as toner, drum unit, and the like as well as information indicating a trouble, which has occurred in the printer 10.

Subsequently, in S150, the HTML data of the web page (not shown by drawing), which represents the fact that the user registration has been completed, is sent to the personal computer 4.

Then, in S160, a web page registration flag, which is stored in the NVRAM 20, is set at "1". In other words, once user registration is made for the relevant printer 10, the web page registration flag is set at "1".

Finally, in S170, when the network controller 16 receives the URL sent from the web server 70, the URL is registered on the link page 60 belonging to the printer 10 (FIG. 4). In other words, when the user information and the printer information is transmitted to the web server 70 in S140, the URL's of the user information page 100 and the printer information page 90 are transmitted from the web sever 70, and then the URL's are set up as places to be linked from the link page 60, as is described above.

On the other hand, when it is determined in S130 that it is not a request for transmitting user information, processing proceeds to S180, where a determination is made whether or not the request from the personal computer 4 is a request for transmitting the link page 60.

When it is determined in S180 that it is a request for transmitting the link page 60, processing proceeds to S190, where the HTML data representing the link page 60 is sent to the personal computer 4 via the network controller 16, and then returns to S100.

When it is determined in S180 that it is not a request for transmitting the link page 60, processing proceeds to S200, where other processing (for example, processing of a request for another web page belonging to the printer 10) is implemented, and then returns to S100.

Processing of the printer timer task, which is implemented by the CPU 14 of the printer 10, will now be described using a flowchart in FIG. 11.

Once the printer timer task is started, processing sleeps for a certain time period in S300, then proceeds to S310 after the certain time period has elapsed.

In S310, it is determined whether or not the web page registration flag stored in the NVRAM 20 is "1". In other words, a determination is made whether or not the user registration for the printer 10 has been completed.

When it is determined in S310 that the web page registration flag is not "1", processing returns to S300.

When it is determined in S310 that the web page registration flag is "1", processing proceeds to S320, where the user information and the printer information stored in the NVRAM 20 is transmitted to the web server 70 via the network controller 16, and then returns to S300.

Briefly, with this printer timer task, the user information and the printer information is transmitted to the web server 70 at certain time intervals as long as the use registration for the printer 10 has been completed. This enables the web server 70 to keep up on changeable information such as information of status and consumables which is included in the printer information.

Figure 12A:
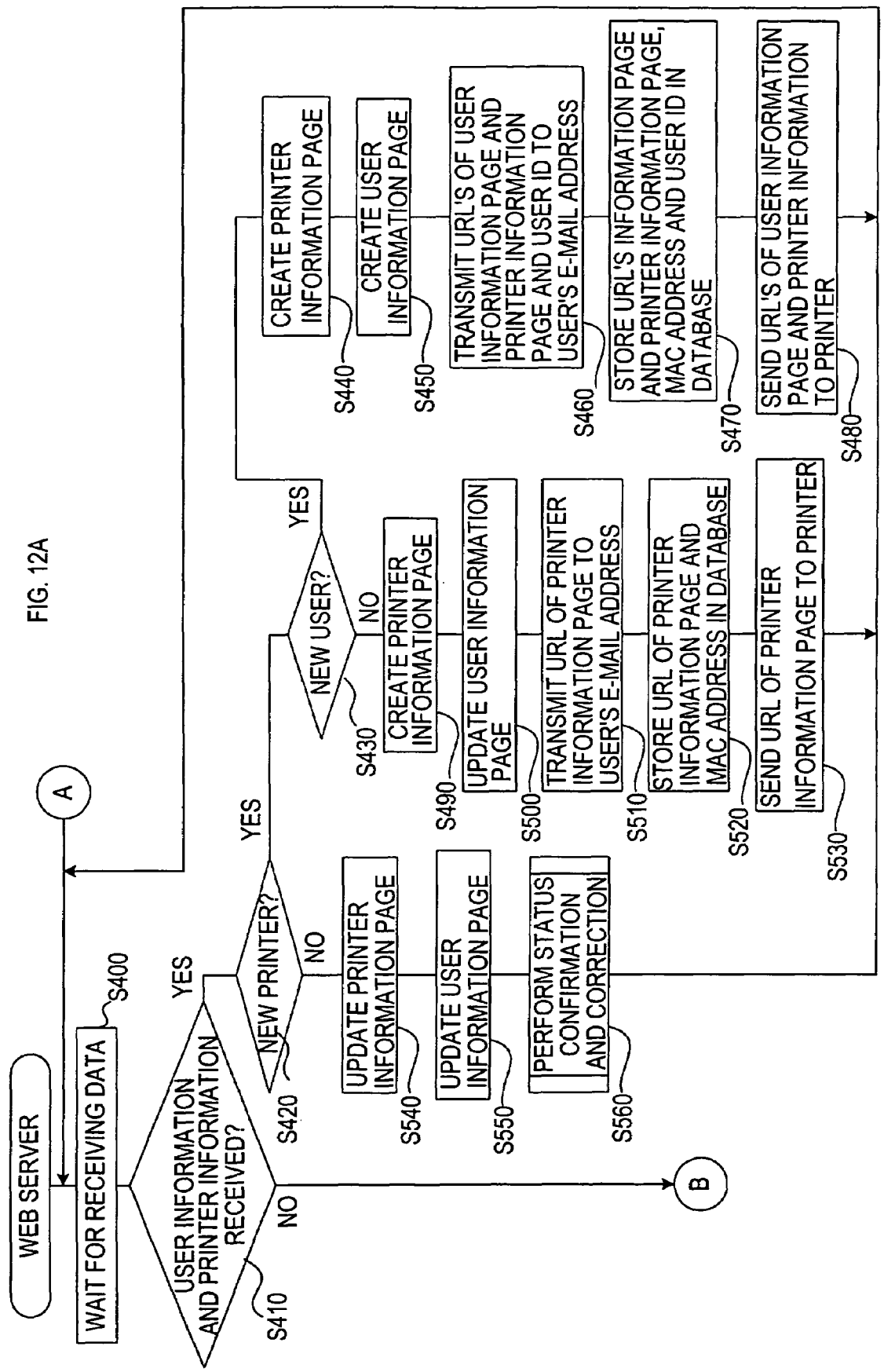

The processing implemented by a CPU 72 of the web server 70 will next be described using the flowcharts in FIGS. 12A and 12B.

Once processing is started, processing waits in S400 until the network controller 74 receives data from outside, then proceeds to S410 when the data is received.

In S410, it is determined whether or not the received data is the user information and the printer information. The user information and the printer information in this case is either the information transmitted by the above described processing in S140 in the printer HTTP task (FIG. 10) or the information transmitted by the above described processing in S320 in the printer timer task (FIG. 11).

When it is determined in S410 that the data received is the user information and the printer information, processing proceeds to S420, where a determination is made whether or not the printer 10 represented by the printer information is a new printer. In this case, it is determined that the printer 10 is a new printer unless the MAC address included in the received printer information is stored in the database of the storage 78.

When it is determined in S420 that the printer 10 is a new printer, processing proceeds to S430, where a determination is made whether or not the user represented by the user information is a new user. In this case, it is determined that the user is a new user unless the user information received includes a user ID, which is stored in the database of the storage 78.

When it is determined in S430 that the user is a new user, processing proceeds from S440 through 480 as described below, and then returns to S400.

First, in S440, the printer information page 90 devoted to the printer 10 (FIG. 7) is created based on the printer information received. More specifically, the consumables information column 92 is created based on the information of status and consumables included in the printer information. In addition, the network analyzer is set up based on the MAC address included in the printer information, and then the software download column 94 is created. Furthermore, the support information column 96 for indicating the information of a successor model of the printer is created based on the version information included in the printer information.

Subsequently, in S450, while a link to the printer information page 90 created in S440 is provided, the user information page 100 indicating the information in respect with the printer 10 owned by the user is created.

Then, in S460, the URL's of the user information page 100 and the printer information page 90 created respectively in S440 and S450 as well as the user ID to be assigned to the user are transmitted to the e-mail address, which is included in the user information received, by e-mail via the network controller 74. This enables the user to know his or her user ID, and to view the user information page 100 and the printer information page 90.

Subsequently, in S470, the URL's of the user information page 100 and the printer information page 90 created respectively in S440 and S450, the user ID transmitted in S450 as well as the MAC address of the printer 10 included in the printer information received are stored in the database (FIG. 9) in the storage 78. In other words, in connection with the user and the printer 10 with user registration completed, the user ID and the MAC address are stored in the database as well as the URL's of the web pages corresponding to the user and the printer.

Finally, in S480, the URL's of the user information page 100 and the printer information page 90 created in S440 and S450 are sent to the printer 10 via the network controller 74. The URL's sent in this manner are set as places to which the link page 60 of the printer 10 is linked, by the processing in S170 in the printer HTTP task, as is described above (FIG. 10).

On the other hand, when it is determined in S430 that the user is not a new user, the received information is considered information in respect with an unregistered printer 10 owned by a registered user, and thus processing proceeds from S490 through S530 as described below, then returns to S400. Although the processing from S490 through S530 is implemented basically for the same purpose as the above described processing from S440 through S480, the details of the processing are somewhat different since the user registration for the user is already completed.

First, in S490, the printer information page 90 is created in the same manner as in the processing in S440.

Subsequently, in S500, the user information page 100 already created for the user is updated. Specifically, a link to the printer information page 90 created in S490, indication of the information related to the printer 10, and the like are newly added.

In S510, the URL of the printer information page 90 created in S490 is transmitted to the e-mail address included in the received user information by e-mail via the network controller 74.

Then, in S520, the URL of the printer information page 90 created in S490 and the MAC address of the printer 10 included in the received printer information are stored in the database in the storage 78 so as to correspond to the already stored user ID and the URL of the user information page 100.

Finally, in S530, the URL of the printer information page 90 created in S490 is sent to the printer 10 via the network controller 74.

In contrast, when it is determined in S420 that the printer is not a new printer, the information is considered information related to an already registered printer, and thus processing proceeds from S540 through S560 as described below, and then returns to S400.

First, in S540, the printer information page 90 corresponding to the printer 10 is updated. Specifically, the content of the consumables information column 92 is changed based on the information of status and consumables included in the printer information.

Subsequently, in S550, the user information page 100 is updated in accordance with the user ID included in the user information. Also in this case, the contents are changed based on the changed information in the same manner as in the processing in S540.

Finally, in S560, status confirmation and correction is performed. Status confirmation and correction here means to prepare access to software on the printer information page 90 in order that when a trouble is found in the status of the printer 10, it is possible to download the software to correct trouble based on the information of status and consumables included in the printer information. For example, access is such that when printing time out status is frequently indicated, software for setting the printing time out waiting time to be longer can be downloaded from the printer information page 90.

When it is determined in S410 that the data received is neither the user information nor the printer information, processing proceeds to S570, where a determination is made whether or not the data received is a request for either the user information page 100 or the printer information page 90. Such as request is transmitted either directly from the personal computer (more specifically, the web browser of the personal computer) 4 or indirectly via the link page 60 of the printer 10.

When it is determined in S570 that it is a request of the user information page 100 or the printer information page 90, processing proceeds to S580, where the HTML data of the requested page, i.e. the user information page 100 or the printer information page 90, is sent, and then returns to S400.

On the other hand, when it is determined in S570 that it is neither a request for the user information page 100 nor the printer information page 90, processing proceeds to S590, where a determination is made whether or not it is a request for downloading software. The request for downloading software is transmitted when a title for downloading software is clicked on the printer information page 90.

When it is determined in S590 that it is a request for downloading software, processing proceeds to S600, where the corresponding software is sent, and then returns to S400.

In contrast, it is determined in S590 that it is not a request for downloading software, processing proceeds to S610, where other processing (for example, the processing in response to a request for another web page provided by the web server 70) is implemented, and then returns to S400.

In the service providing system of the present embodiment, as for the printer 10, the network controller 16 serves as a transmitting unit, a URL obtaining unit and an apparatus-related web page providing unit.

In the web server 70, the network controller 74 serves as a receiving unit, a web page creating unit and a URL outputting unit.

As mentioned above, in the service providing system of the embodiment, the web server 70 creates the printer information page 90 devoted to each printer 10, for which a use registration is completed, and the services related to the printer 10 are provided through the page 90. Accordingly, it is easier for the user of the printer 10 to locate the necessary information, which improves comfortability when receiving the service.

Also, in the present system, it is possible to download the network analyzer already set up for the printer 10 of the user from the printer information page 90, and thus the network analyzer requiring professional knowledge to set up the same can easily be used.

Furthermore, in the present system, the printer 10 transmits the printer information to the web server 70 regularly, which enables provision not only of static information about the printer 10 but also of elaborate services in accordance with changeable information (for example, the remaining amount of consumables).

In addition, in the present system, the services are provided by the web server 70 on the Internet 8, and thus information which changes daily (for example, information that a successor model of the present printer 10 was newly released) can be obtained as well. Furthermore, the present system is also advantageous in that a large volume of information can be utilized.

Although the present invention has been described with respect to one embodiment, it is to be understood that the present invention can be embodied in a variety of forms.

Figure 11:
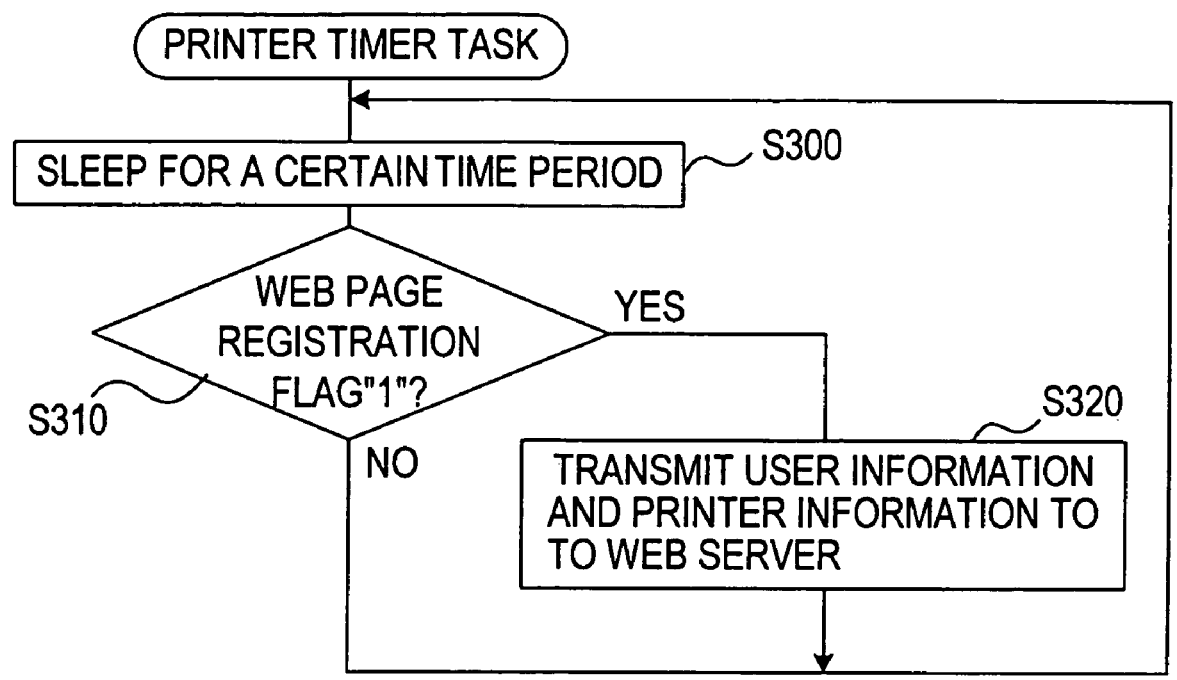
FIG. 11 is a flowchart showing the processing of a printer timer task.

For example, while the printer 10 transmits the user information and the printer information to the web server 70 at certain intervals as a printer timer task shown in FIG. 11 in the service providing system of the above embodiment, the printer timer task may be modified. For example, as the processing in S300, the sleep may continue until a trouble related to the printer 10 is detected, instead of the sleep for a certain time period. With this configuration, the user information and the printer information is transmitted to the web server 70 in the event that a trouble occurs in the printer 10, and thus the service for the trouble (for example, indication of how to deal with the trouble or preparation of software to deal with the trouble) is provided promptly.

It is also possible to transmit the user information and the printer information to the web server 70 when the printer 10 is turned on. In this case, as the processing in S300, instead of sleeping for a certain time period, a determination may be made whether the user information and the printer information has not even once been transmitted to the web server 70 since the printer 10 was turned on, or has been transmitted. By this, the data can be transmitted at an appropriate frequency with a simple configuration.

While the URL's of the user information page 100 and the printer information page 90 are notified to a user by e-mail in the service providing system of the above embodiment, it may be possible, for example, that the web server 70 transmits the URL's to the printer 10 and the printer 10 prints out the URL's.

Furthermore, it may be possible that when a user accesses to a predetermined web page (for example, the top page of the solution center) from the personal computer 4 and inputs his/her user ID on the web page, the web server 70 provides a web page (specifically the HTML data file into which an instruction to automatically jump is written), which automatically jumps to the URL of the user information page 100 corresponding to the user ID. In addition, a link to the printer information page 90 related to the user may be attached in the user information page 100. This enables the user to access to the user information page 100 and the like without knowing the URL of the user information page 100 or the printer information page 90 even if the user only knows the URL of the predetermined web page.

While the web server 70 is provided on the Internet 8 in the service providing system of the above embodiment, the web server 70 may be provided, for example, on the LAN 2. Also in this case, the web server 70 is able to provide a variety of information, which cannot be obtained by each printer alone, using web pages corresponding respectively to a plurality of printers 10 connected to the web server 70 via the LAN 2. It is advantageous that a plurality of printers can be managed centrally and the volume of information to be stored in each printer 10 can be reduced.

While the printer 10 is connected to the personal computer 4 via the LAN 2 in the service providing system of the above embodiment, the printer 10 may be connected, for example, via a wireless LAN. In other words, the printer 10 may be configured to have a wireless LAN interface instead of the Ethernet Interface 17.

Furthermore, the HTML data to be transmitted in S580 may be created and sent each time a request for the page is received instead of being stored, or the HTML data created at a predetermined timing may be stored and the stored HTML data is sent when a request of the page is received. In the former case, the load required for storing the HTML data in the web server 70 may be reduced, while in the latter case, waiting time for the user may be shortened because it is not necessary to create the HTML data when a request is received.

What is claimed is:

1. A service providing system for providing services related to an apparatus by means of a web server using a web page, the apparatus comprising:
    a transmitting unit that transmits specific information specific to the apparatus to the web server provided outside and connected to a network,
    an apparatus-related web page providing unit that provides an apparatus-related web page related to the apparatus in response to a request from an outside device provided with a web browser, and
    a (Uniform Resource Locator) URL obtaining unit; and the web server comprising:
    a receiving unit that receives the specific information of the apparatus transmitted by the transmitting unit of the apparatus,
    a web page creating unit that creates a devoted web page related to the apparatus from which the specific information is transmitted based on the specific information received by the receiving unit, and
    a URL outputting unit that outputs the URL of the devoted web page created by the web page creating unit,
    wherein the URL obtaining unit of the apparatus obtains the URL of the devoted web page output by the URL outputting unit of the web server, and
    wherein the apparatus displays a link specified by the URL of the devoted web page obtained by the URL obtaining unit on the apparatus-related web page provided by the apparatus-related web page providing unit, and wherein the apparatus includes a printer and the specific information includes printer information.

2. The service providing system according to claim 1, wherein the specific information includes user registration information.

3. The service providing system according to claim 2, wherein the user registration information includes a user ID for identifying a user.

4. The service providing system according to claim 2, wherein when user registration is performed, required information about the user except for a user ID is input from a terminal unit associated with the apparatus and transmitted to the web server through the apparatus, and wherein a user ID assigned by the web server is sent to the terminal unit.

5. The service providing system according to claim 3, wherein the web server updates a user information page in accordance with the user ID.

6. The service providing system according to claim 2, wherein the user registration information includes information indicating a user's address.

7. The service providing system according to claim 2, wherein the user registration information includes an e-mail address for transmitting a user information page in respect with a user to the user.

8. The service providing system according to claim 1, wherein the specific information includes consumables information related to the apparatus.

9. The service providing system according to claim 8, wherein the consumables information includes information of the remaining amount of toner.

10. The service providing system according to claim 1, wherein the specific information includes printer address information.

11. The service providing system according to claim 10, wherein the printer address information includes information to set up exclusive software.

12. The service providing system according to claim 11, wherein the exclusive software includes a network analyzer.

13. The service providing system according to claim 1, wherein the specific information includes model information indicating the model name of the apparatus.

14. The service providing system according to claim 13, wherein the model information includes support information to support the apparatus.

15. The service providing system according to claim 13, wherein the model information includes information of a successor model of the apparatus.

16. The service providing system according to claim 2, wherein the devoted web page includes a user information page created based on the user registration information.

17. The service providing system according to claim 16, wherein the apparatus is a printer, and wherein the user information page includes a link to a printer information page indicating information related to the printer.

18. The service providing system according to claim 1, wherein the devoted web page includes a printer information page created based on at least one of model information about the model of a printer, address information for specifying the printer, and consumables information related to the printer.

19. The service providing system according to claim 18, wherein the printer information page may be read through the link from a user information page.

20. The service providing system according to claim 1, wherein the devoted web page comprises a user information page created based on user information and a printer information page created based on at least one of model information, address information and consumables information.

21. The service providing system according to claim 1, wherein the devoted web page displays information corresponding to the specific information.

22. The service providing system according to claim 1, wherein the devoted web page is designed for downloading software corresponding to the specific information.

23. The service providing system according to claim 1, wherein the devoted web page is linked to a web page for providing services corresponding to the specific information.

24. The service providing system according to claim 1, wherein the transmitting unit transmits the specific information to the web server at each predetermined timing, and
wherein, when the devoted web page related to the apparatus, from which the specific information received by the receiving unit is transmitted, is already created, the web page creating unit updates the contents of the web page based on the received specific information.

25. The service providing system according to claim 1, wherein the apparatus includes a trouble detecting unit that detects a trouble related to the apparatus, and wherein the transmitting unit uses the timing when a trouble is detected by the trouble detecting unit as the predetermined timing for transmitting the specific information to the web server.

26. The service providing system according to claim 1, wherein the apparatus periodically transmits specific information specific to the apparatus to the web server.

27. An apparatus for use in a service providing system wherein a web server for creating a web page based on information received from the apparatus provides services related to the apparatus using the created web page, and wherein the web server outputs a URL (Uniform Resource Locator) of the created web page by a URL outputting unit to the apparatus,
the apparatus comprising:
a transmitting unit that transmits specific information specific to the apparatus to the web server provided outside and connected to a network,
an apparatus-related web page providing unit that provides an apparatus related web page related to the apparatus in response to a request from an outside device provided with a web browser, and
a URL obtaining unit that obtains the URL of the created web page output by the URL outputting unit of the web server,
wherein the apparatus displays a link specified by the URL of the created web page obtained by the URL obtaining unit on the apparatus-related web page provided by the apparatus-related web page providing unit, and wherein the apparatus includes a printer and the specific information includes printer information.

28. The apparatus for use in the service providing system according to claim 27, wherein the specific information includes user registration information.

29. The apparatus for use in the service providing system according to claim 28, wherein the user registration information includes a user ID for identifying a user.

30. The apparatus for use in the service providing system according to claim 28, wherein when user registration is performed, required information about the user except for a user ID is input from a terminal unit associated with the apparatus and transmitted to the web server through the apparatus, and wherein a user ID assigned by the web server is sent to the terminal unit.

31. The apparatus for use in the service providing system according to claim 29, wherein the web server updates a user information page in accordance with the user ID.

32. The apparatus for use in the service providing system according to claim 28, wherein the user registration information includes information indicating a user's address.

33. The apparatus for use in the service providing system according to claim 28, wherein the user registration information includes an e-mail address for transmitting a user information page in respect with a user to the user.

34. The apparatus for use in the service providing system according to claim 27, wherein the specific information includes consumables information related to the apparatus.

35. The apparatus for use in the service providing system according to claim 34, wherein the consumables information includes information of the remaining amount of toner.

36. The apparatus for use in the service providing system according to claim 27, wherein the specific information includes printer address information.

37. The apparatus for use in the service providing system according to claim 36, wherein the printer address information includes information to set up exclusive software.

38. The apparatus for use in the service providing system according to claim 37, wherein the exclusive software includes a network analyzer.

39. The apparatus for use in the service providing system according to claim 27, wherein the specific information includes model information indicating the model name of the apparatus.

40. The apparatus for use in the service providing system according to claim 39, wherein the model information includes support information to support the apparatus.

41. The apparatus for use in the service providing system according to claim 39, wherein the model information includes information of a successor model of the apparatus.

42. The apparatus for use in the service providing system according to claim 27, wherein the apparatus periodically transmits specific information specific to the apparatus to the web server.

* * * * *